(12) United States Patent
Zhang

(10) Patent No.: US 10,834,184 B2
(45) Date of Patent: Nov. 10, 2020

(54) SENDING A SENSOR NODE A REQUEST FOR SENSOR DATA THAT IDENTIFIES ANOTHER NODE TO PROCESS THE DATA

(75) Inventor: Peng Zhang, Espoo (FI)

(73) Assignee: Nokia Corporation, Espoo (FI)

( * ) Notice: Subject to any disclaimer, the term of this patent is extended or adjusted under 35 U.S.C. 154(b) by 286 days.

(21) Appl. No.: 14/412,706

(22) PCT Filed: Jul. 5, 2012

(86) PCT No.: PCT/FI2012/050710
§ 371 (c)(1),
(2), (4) Date: Jan. 5, 2015

(87) PCT Pub. No.: WO2014/006264
PCT Pub. Date: Jan. 9, 2014

(65) Prior Publication Data
US 2015/0189007 A1    Jul. 2, 2015

(51) Int. Cl.
*H04L 29/08* (2006.01)
*H04W 4/38* (2018.01)
*G06F 9/50* (2006.01)

(52) U.S. Cl.
CPC .......... *H04L 67/104* (2013.01); *G06F 9/5072* (2013.01); *H04L 67/12* (2013.01); *H04W 4/38* (2018.02); *Y02D 10/22* (2018.01); *Y02D 10/36* (2018.01)

(58) Field of Classification Search
CPC ........ H04L 67/104; H04L 67/12; H04W 4/38; G06F 9/5072; Y02D 10/36; Y02D 10/22
USPC ....... 709/217, 218, 219, 220, 221, 222, 227, 709/228, 229
See application file for complete search history.

(56) References Cited

U.S. PATENT DOCUMENTS

| | | | |
|---|---|---|---|
| 7,143,143 B1 * | 11/2006 | Thompson | G06F 16/9574 709/217 |
| 7,372,595 B1 * | 5/2008 | Lyon | H04N 1/00132 358/1.9 |
| 7,496,630 B2 * | 2/2009 | Arellano | H04L 51/04 709/206 |
| 8,314,730 B1 * | 11/2012 | Musiak | G01S 7/003 342/25 B |
| 2002/0129170 A1 * | 9/2002 | Moore | H04L 29/06 709/249 |

(Continued)

FOREIGN PATENT DOCUMENTS

| | | |
|---|---|---|
| CN | 101258530 A | 9/2008 |
| CN | 101695440 A | 4/2010 |

(Continued)

*Primary Examiner* — David P Zarka
(74) *Attorney, Agent, or Firm* — Laine IP Oy

(57) ABSTRACT

In accordance with an example embodiment of the present invention, there is provided an apparatus comprising at least one processor and computer program code, configured to cause the apparatus to at least transmit to a sensor node a request for processed sensor data, the request comprising an identity of a second node capable of processing sensor data, and receive a message enabling access to the processed sensor data, wherein the second node is comprised in the same peer network as the apparatus. The apparatus may also be configured to receive from the second node an indication that the second node has data processing capability it is willing to provide.

14 Claims, 4 Drawing Sheets

(56) References Cited

U.S. PATENT DOCUMENTS

| | | | |
|---|---|---|---|
| 2002/0198990 A1* | 12/2002 | Bradfield | H04L 41/0213 709/224 |
| 2003/0020948 A1* | 1/2003 | Jarvis | H04L 41/046 358/1.15 |
| 2003/0225754 A1* | 12/2003 | Chen | G06F 16/20 |
| 2004/0204035 A1* | 10/2004 | Raghuram | H04B 7/082 455/553.1 |
| 2004/0223485 A1* | 11/2004 | Arellano | H04L 51/04 370/351 |
| 2004/0255167 A1* | 12/2004 | Knight | G06Q 10/10 726/24 |
| 2007/0073861 A1* | 3/2007 | Amanuddin | H04L 43/0817 709/224 |
| 2007/0282746 A1* | 12/2007 | Anke | G06F 9/5044 705/51 |
| 2009/0157839 A1* | 6/2009 | Diederichs | G05B 19/4185 709/208 |
| 2009/0164606 A1* | 6/2009 | Epifania | G06F 16/957 709/219 |
| 2009/0164823 A1* | 6/2009 | Aaltonen | G01R 31/3648 713/340 |
| 2009/0324029 A1* | 12/2009 | Araikum | G06T 5/003 382/128 |
| 2010/0082648 A1* | 4/2010 | Potapov | G06F 3/0611 707/756 |
| 2010/0150016 A1* | 6/2010 | Barr | H04L 12/2801 370/252 |
| 2010/0161101 A1* | 6/2010 | Pouyez | G06Q 10/10 700/108 |
| 2012/0076205 A1* | 3/2012 | Segall | H04N 9/045 375/240.12 |
| 2012/0089708 A1* | 4/2012 | Kim | H04L 67/34 709/220 |
| 2012/0167074 A1* | 6/2012 | Rajpure | H04L 67/06 717/178 |
| 2012/0304277 A1* | 11/2012 | Li | H04L 63/0218 726/12 |
| 2013/0054634 A1* | 2/2013 | Chakraborty | H04L 67/1091 707/769 |
| 2014/0086151 A1* | 3/2014 | Damola | H04W 28/16 370/328 |

FOREIGN PATENT DOCUMENTS

| | | |
|---|---|---|
| EP | 1855202 A1 * | 11/2007 |
| EP | 1855202 A1 | 11/2007 |
| WO | WO 2007/028690 A1 * | 3/2007 |
| WO | WO2007028690 A1 | 3/2007 |

* cited by examiner

SENDING A SENSOR NODE A REQUEST FOR SENSOR DATA THAT IDENTIFIES ANOTHER NODE TO PROCESS THE DATA

TECHNICAL FIELD

The present application relates generally processing sensor data in networked, peer-to-peer or cloud computing settings.

BACKGROUND

Automated sensing can be employed to produce a large amount of data with little or no human intervention. Sometimes, automated sensing can be employed in environments where humans cannot readily work, for example inside nuclear reactors, in space or along the wings of commercial passenger aircraft. Alternatively automated sensing may be employed to generate sensing data for providing rich media services to human users. An automated sensing unit may be termed a sensor, wherein a sensor may be capable of sensing a physical property. A sensor may further be capable of communicating its sensed data, periodically or as a continuous sensor data stream.

Sensor networks comprise a plurality of sensors, or sensor nodes, which may be connected to each other and/or a central node by means of wireless or wired communication links. A sensor network may be employed to sense temperature, pressure or other physical properties or media information. For example, sensors may be installed in a city centre or shopping outlet to produce realtime or semi-realtime video information.

Sensors comprised in sensor networks may be powered by batteries, or alternatively by a stable power supply. Where batteries are used, replacing the batteries becomes necessary to prevent sensor data from ceasing when the batteries run out. Power requirements of sensors may vary, in certain applications sensors can be designed to consume very little power by miniaturization and employing low-power communication.

In some sensor networks, packet-switched communications are used to relay sensor data from sensors. In networks with relatively few sensors, circuit-switched communications may be employed. An example of the latter are closed-circuit television monitoring systems, where a limited number of cameras produce circuit-switched television monitoring data which may be observed in monitors in a local or remote guard post.

SUMMARY

Various aspects of examples of the invention are set out in the claims.

According to a first aspect of the present invention, there is provided an apparatus, comprising at least one processor, at least one memory including computer program code, the at least one memory and the computer program code configured to, with the at least one processor, cause the apparatus to at least transmit to a sensor node a request for processed sensor data, the request comprising an identity of a second node capable of processing sensor data, and receive a message enabling access to the processed sensor data, wherein the second node is comprised in the same peer network as the apparatus.

According to a second aspect of the present invention, there is provided an apparatus, comprising a receiver configured to receive sensor data, at least one processing core configured to associate at least one data processing operation with the sensor data, the at least one processing core being configured to cause a message to be transmitted to a first device, the message comprising an identifier of at least one of the at least one data processing operation.

According to a third aspect of the present invention, there is provided a method, comprising receiving sensor data, associating at least one data processing operation with the sensor data, causing a message to be transmitted to a first device, the message comprising an identifier of at least one of the at least one data processing operation.

According to a third aspect of the present invention, there is provided a method, comprising transmitting to a sensor node a request for processed sensor data, the request comprising an identity of a second node capable of processing sensor data, and receiving a message enabling access to the processed sensor data, wherein the second node is comprised in the same peer network as the apparatus.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
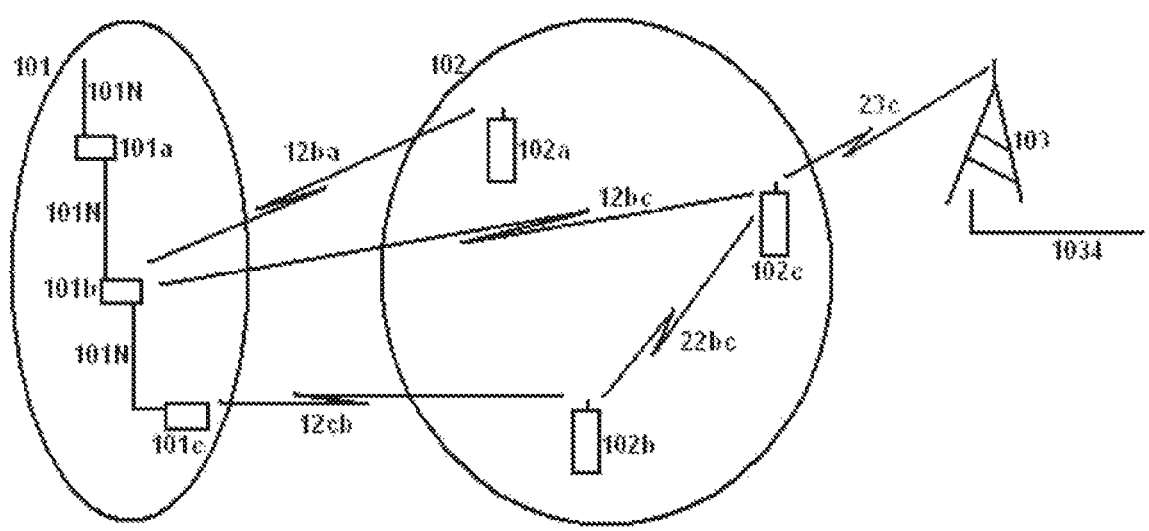
FIG. 1 illustrates an example system capable of supporting at least some embodiments of the invention.

FIG. 1 illustrates an example system capable of supporting at least some embodiments of the invention. Illustrated in FIG. 1 are sensor network 101, mobile cloud 102 and cellular base station 103. Sensor network 101 may comprise at least one sensor node, in FIG. 1 three sensor nodes 101a, 101b and 101c are illustrated. The sensor nodes are connected to each other with a sensor interconnect network 101N. Sensor node 101a is illustrated as being connected via sensor interconnect network 101N with further nodes, which are not illustrated in FIG. 1. Such further nodes may comprise, for example, further sensor nodes or a central server that is configured to manage sensor network 101 and/or receive sensor data therefrom. Sensor nodes 101a, 101b and 101c may be furnished with sensor elements to produce sensor data representing at least one physical property of the surroundings of the sensor. For example, a sensor may provide an estimate of prevailing atmospheric pressure at an interval of five seconds. Another sensor may produce a continuous video feed at a preconfigured or dynamically configurable resolution, for example. Together the sensor network may provide for information relating to, for example, a density of pedestrian traffic and a congestion level of a local data network.

Mobile cloud, which may be referred to also as mobile peer-to-peer network, 102, is illustrated as comprising three mobiles 102a, 102b and 102c. The mobiles may comprise cellular mobile telephones, laptop computers, tablet computers, personal digital assistant, PDA, devices or other electronic devices with wired and/or wireless communication capability. Mobile 102c is illustrated as being in wireless communication with base station 103 via wireless link 23c. Base station 103 may be configured to operate in accordance with a cellular radio access technology, such as long term evolution, LTE, wideband code division multiple access, WCDMA, or another technology.

Base station 103 may control a cell operating in accordance with the technology, and wireless link 23c may operate in accordance with the technology. Wireless link 23c may comprise an uplink for conveying information from mobile 102c to base station 103, and a downlink for conveying information from base station 103 to mobile 102c. A user of mobile 102c may access services of the cellular network where base station 103 is comprise in, via wireless link 23c. In other words, the user may engage in cellular telephony, web browsing and/or other cellular services via wireless link 23c and base station 103. Base station 103 is operably connected, via connection 1034, to a base station controller node or another cellular network node, which are not illustrated in FIG. 1. In some embodiments, such as for example in LTE systems, base station 103 may be connected to another base station.

In the mobile cloud, mobile 102c is illustrated as being in communication with mobile 102b via wireless connection 22bc. Wireless connection 22bc may operate in accordance with a different wireless communication technology than wireless connection 23c. For example, wireless connection 22bc may operate in accordance with the wireless local area network, WLAN, Bluetooth, or another technology. In some embodiments, wireless connection 22bc operates using a same or a different cellular radio technology as wireless connection 23c.

The mobile cloud may be maintained using wireless connections such as wireless connection 22bc between mobiles comprised in the mobile cloud. Each mobile comprised in the mobile cloud may maintain a data structure comprising information relating to the mobile cloud. Information relating to the mobile cloud may comprise, for example, identities and capabilities of mobiles comprised in the cloud, information relating to radio paths between pairs of mobiles comprised in the mobile cloud and user preferences of mobiles comprised in the mobile cloud. The information, mobile cloud and wireless connections interconnecting the mobiles in the mobile cloud may together enable virtualization of at least some capabilities of mobiles 102a, 102b and 103c. Virtualized capabilities may be indicated as available to other mobiles in the cloud, for example where mobile 102b is temporarily outside cellular coverage of base station 103, it may access the cellular communication capability of mobile 102c to send a message using the cellular network, wherein the message is transferred via wireless connections 22bc and 23c, and connection 1034. In this case, mobile 102c may advertise a virtualized active cellular communication capability in the mobile cloud, enabling mobile 102b to use it.

Alternatively to each mobile storing the information relating to the mobile cloud, at least one of the mobiles may at least in part rely on at least one further mobile comprised in the mobile cloud to store the information relating to the mobile cloud. For example, the mobile cloud may designate one mobile as a lead node responsible for maintaining the information relating to the mobile cloud. In this example, when other mobiles need the information relating to the mobile cloud, they may be configured to request the relevant part, or all, of the information relating to the mobile cloud from the designated lead node.

Although only one wireless link 22bc is illustrated connecting mobiles comprised in mobile cloud 102, it is understood that mobiles comprised in the cloud may be capable of communicating with each other in general, using wireless links similar to wireless link 22bc. Each mobile may not be capable of establishing a direct wireless link with each and every other mobile in the mobile cloud, but the mobile cloud may nonetheless be communicably bound in the sense that each mobile comprised in the mobile cloud may be capable of communicating with each other mobile comprised in the mobile cloud when messages are routed within the mobile cloud indirectly via mobiles comprised in the cloud.

In FIG. 1, wireless links 12ba, 12bc and 12cb connect sensor nodes comprised in sensor network 101 to mobiles comprised in the mobile cloud 102. In detail, wireless link 12ba connects sensor node 101b to mobile 102a, wireless link 12bc connects sensor node 101b to mobile 102c and wireless link 12cb connects sensor node 101c to mobile 102b. Wireless links 12ba, 12bc and 12cb may be based on the same, or different, radio access technologies than links, such as wireless link 22bc, within mobile cloud 102, and links, such as wireless link 23c, between mobiles and cellular base stations. One example of a technology wireless links 12ba, 12bc and 12bc may act in accordance with is near field communication, NFC. Another example is the Wibree low-power communication technology.

Mobile 102a, for example, may request sensor data from sensor node 101b over wireless link 12ba. In detail, mobile 102a may transmit a request message to sensor node 101b over wireless link 12ba. Responsively, sensor node 101b may be configured to provide the requested sensor data, either over wireless link 12ba or by transmitting over wireless link 12ba information enabling mobile 102a to access the requested sensor data. For example, where sensor node 101b has uploaded sensor data to a server node using sensor interconnect network 101N, sensor node 101b may provide mobile 102a information enabling mobile 102a to access the sensor data from the server node. Such information may comprise an address of the server node and, optionally, credentials configured to allow access for mobile 102a to the requested sensor data, for example. The information may also or alternatively comprise a data identifier identifying a specific set of sensor data stored in the server node from among a plurality of sensor data sets stored in the server node.

Mobile 102a may request sensor data from sensor node 101b over wireless link 12ba even when the requested sensor data has not been sensed by sensor 101b. In this case, sensor network 101 may communicate using the sensor interconnect network 101N to discover, if a sensor is comprised in sensor network 101 that is capable of providing the requested sensor data. Responsive to such a sensor node being identified, the identified sensor node may provide the requested sensor data, or information enabling access to it, to mobile 102a either via sensor interconnect 101N, sensor node 101b and wireless link 12ba, or by opening a new, direct wireless link to mobile 102a. In some embodiments, the identified sensor node may be configured to provide the requested sensor data, or information enabling access to it, to any mobile comprised in mobile cloud 102. The requested sensor data, or information enabling access to it, can then be provided to mobile 102a from the mobile receiving the data, or information enabling access to it, by communication internal to mobile cloud 102.

Mobile 102a may be configured to request sensor data in processed form from sensor node 101b. As a first example, where mobile 102a is capable of displaying only a certain, first resolution of video feed to a user, mobile 102a may be configured to request a video feed at the first resolution. If sensor node 101b provides a video feed at a different resolution, the raw sensor data of sensor node 101b may need to be processed, or re-sampled, to conform to the requested format. A second example of processing is processing where sampled audio data is speech-recognized into text and, optionally, translated from a first language to a second language. Transferring the contents of sampled speech in text form may consume substantially less communication resources than transferring the sampled speech in an audio format. In this example, the raw sensor data is an audio feed, and processed sensor data is text conveying the meaning of what is spoken in the audio feed. A third example of processing is processing where more than one unit or feed of raw, or unprocessed, sensor data is fused to provide compound sensor data comprising information stemming from more than one physical property and/or sensor node.

Processing of sensor data may take place in a sensor node, but depending on the type of processing and the design of the sensor node concerned, the processing may not be possible. In some embodiments, sensor networks such as sensor network 101 comprise sensor nodes designed for high volumes of shipped products, wherein the individual sensor nodes have only limited processing and other capabilities. Therefore, the processing, storage and communication capabilities of sensor nodes 101a, 101b and 101c may be limited.

Instead of a sensor node, processing of sensor data may take place in a server node storing the sensor data or in a mobile requesting the processed sensor data, such as for example mobile 102a. For example, mobile 102a may request and receive the sensor data, or access to the sensor data, and subsequent to receiving it, process the sensor data locally to obtain processed sensor data. In some embodiments, mobile 102a may request the server node to process sensor data before providing it to mobile 102a.

In some embodiments, a mobile 102a requesting processed sensor data is configured to use virtualized capabilities in the mobile cloud to perform processing of sensor data to produce the processed sensor data. For example, where mobile 102a knows from participating in the mobile cloud that mobile 102b has a first capability needed for the processing, it may direct the processing of sensor data from, for example, sensor node 101b to occur in mobile 102b. The directing may comprise that mobile 102a transmits a request to sensor node 101b that identifies mobile 102b as a node that is to perform the processing. The request may comprise an identifier or descriptor allowing sensor node 101b and/or mobile 102b to deduce which processing operation, or operations, are to be performed on the sensor data. Responsive to receiving such a request, sensor node 101b may be configured to enable access to the sensor data for mobile 102b. Enabling in this context may comprise transmitting, or causing to be transmitted, the sensor data to mobile 102b, or providing mobile 102b with information allowing mobile 102b to access the sensor data in a server node, for example. Such information has been described above. Responsive to being enabled by sensor node 101b to access the sensor data, and responsive to receiving the identifier or descriptor, mobile 102b may be configured to access the sensor data and perform the processing on the sensor data to obtain processed sensor data. The processed sensor data may subsequently be provided to the requesting mobile 102a either by transmitting it, causing it to be transmitted or by providing mobile 102a with information enabling mobile 102a to access it. In some embodiments, the identifier or descriptor may be provided from mobile 102a to mobile 102b by signaling internal to the mobile cloud, in other words it needn't be routed via the sensor node.

In some embodiments, a mobile 102a requesting processed sensor data is configured to use more than one virtualized capability in the mobile cloud to perform processing of sensor data to produce the processed sensor data. In general, the requesting mobile may identify from information relating to the mobile cloud, which mobiles in the mobile cloud have capabilities that may be applied to sensor data. The requesting mobile may define a sequence of processing actions, such that when the processing actions comprised in the sequence are performed on sensor data in order, the correct kind of processed sensor data is produced as an output from the last processing action in the sequence. To trigger execution of the sequence, the requesting mobile may prompt a sensor node to enable a first mobile in the mobile cloud to access the sensor data, and the requesting mobile may request the first mobile to perform at least the first processing action in the sequence. The first mobile in this example is a mobile that advertises in the mobile cloud a capability corresponding to the first processing action in the sequence. Responsive to completion of the last processing action in the sequence that the first mobile is willing or able to provide, the processing of the sensor data is delegated to a second mobile in the cloud, wherein the second mobile is one that advertises in the mobile cloud a capability corresponding to a processing action that is next in sequence to the last one performed by the first mobile. Delegating may comprise enabling access to the partly processed sensor data, and providing a request to perform at least the next processing action in the sequence. Enabling access to the data may comprise transmitting the data, causing the data to be transmitted or providing information enabling the second mobile to access the data. The sequence of processing actions is performed on the sensor data in this fashion, with processing being delegated to mobiles comprised in the mobile cloud in sequence, until the completely processed sensor data is made available to the requesting mobile, in other words the requesting mobile is enabled to access it.

Delegating processing from a first mobile to a next mobile may be directed by the requesting mobile 102a, such that once the first mobile completes its processing of the sensor data, it informs mobile 102a that it is ready, responsive to which mobile 102a may transmit a request to the next mobile to start performing at least the next processing action in the sequence on the partly processed sensor data. Likewise, once the next mobile is ready, it may inform the requesting mobile which would then transmit a request for processing to a subsequent mobile. Alternatively, the first mobile may pass to the next mobile a description of the sequence and an indication of the phase in which the processing is in the sequence following completion of processing in the first mobile. In this latter alternative, the requesting mobile 102a may have provided the description of the sequence to the first mobile when initiating the processing, either directly or via a sensor node, with an explicit or implicit indication that the processing is to commence from the first processing action in the sequence. In some embodiments, there is no indication of the phase in which the processing is in the sequence, but each mobile will remove from the description of the sequence indications of processing actions they have performed, such that the next mobile can always start from the beginning of the description of the sequence. In the description of the sequence, each processing action comprised in the sequence may be associated with an identity of a mobile that is to perform the processing action. The description of the sequence may also comprise information enabling access to the sensor data. Alternatively, each mobile participating in the processing may be configured to pass on the sensor data, in partially processed form, to the next mobile in the sequence.

An example of a virtualized capability is translation of text, wherein a mobile with access to base station 103, for example, advertises in the mobile cloud that it is capable of translating text. Responsive to being delegated a task to translate text, the mobile may be configured to transmit the text to be translated via base station 103 to a translating service in the Internet, and responsive to receiving translated text from the translating service, the mobile may provide the translated text to a requesting mobile, or a next mobile in a processing sequence.

Using embodiments of the invention, a mobile comprised in a mobile cloud may be made capable of obtaining sensor data from a sensor network comprising low-capability sensor nodes, such that the sensor data is obtained in processed form despite low capabilities of sensor nodes. Since processing may be provided by members of the mobile cloud, a requesting mobile may be able to request more varied kinds of processing the larger the mobile cloud is. Since at least one mobile will be present to request processed sensor data, the system overall will have needed processing capability only when needed, in other words when the requesting mobile, which may also be a processing mobile, is present. Thus benefits of the invention are obtained from interaction between less capable sensor nodes and more capable mobile nodes.

In general, there is provided a first apparatus, such as for example a sensor node or a control device for inclusion in a sensor node, to control the functioning of the sensor node. A control device may comprise, for example, a processor or integrated circuit configured to at least participate in controlling the functioning of the first apparatus.

The first apparatus may comprise a receiver configured to receive sensor data. Where the first apparatus is a control device, the receiver may be comprised as an input device comprised in the control device, such as for example a serial port pin and associated serial port, or a parallel port, to enable the control device to receive information from, for example, a sensor element comprised in a sensor node. The information may be conveyable from the sensor element to the input device of the control device via electrical leads internal to a sensor node, for example. Where the first apparatus is a sensor node, receiving sensor data may similarly comprise receiving sensor data from a sensor element internally in the sensor node.

The first apparatus may comprise at least one processing core configured to associate at least one data processing operation with the sensor data. The data processing operation may comprise an operation to at least in part convert sensor data to processed sensor data, for example to reduce the size of the sensor data or to process the sensor data into a form usable for multimedia. The at least one processing core may be configured to cause a message to be transmitted to a first device, the message comprising an identifier of at least one of the at least one data processing operation. The first device may comprise, for example, a mobile device comprised in a mobile cloud.

In some embodiments, the first apparatus comprises at least one sensor element configured to produce the sensor data by physical measurement and to provide it to the receiver internally in the apparatus. Physical measurement may comprise measurement of a physical property such as magnetic field strength, temperature, pressure or particle flux, for example. Physical measurement may also or alternatively comprise capture of video, audio or generally media data. Physical measurement may provide for describing properties of the real world using representations in digital format.

In some embodiments, the first apparatus is configured to participate as a sensor node in a sensor network. Participating in a sensor network may comprise communicating with at least one further sensor node via a communication channel.

In some embodiments, the message enables access to at least part of the sensor data and comprises an implicit or explicit request to apply the at least one of the at least one data processing operation to the sensor data. Enabling access may comprise that the message comprises the at least part of the sensor data, or alternatively that the message comprises information enabling access to the at least part of the sensor data. The information enabling access may comprise, for example, an address and, optionally, access credentials needed to access the at least part of the sensor data in a network location. An implicit request may comprise that the message comprises the identifier, wherein the first apparatus knows that the first device will consider the identifier as a request to perform the data processing operation identified by the identifier.

In some embodiments, the message is transmitted to the first device at least in part responsive to a second message being received from a second device. The second message may comprise an identifier of the at least one data processing operation. The second message may comprise an identifier of the first device. The second message may be a request message. In some embodiments, the message is transmitted to the first device at least in part responsive to the first apparatus determining a resource shortage in the first apparatus, for example by determining that a state of resource shortage exists in the sense that the first apparatus lacks capability to perform the at least one data processing operation while performing other necessary tasks. Other necessary tasks may comprise, for example, participating in sensor network communication on sensor interconnect network 101N or capturing fresh sensor data.

In some embodiments, the first apparatus is configured to enable the second device to access processed sensor data subsequent to the at least one data processing operation being applied to the sensor data to convert the sensor data into the processed sensor data. The first apparatus may be configured to transmit the processed sensor data to the second device after receiving the processed sensor data from the first device. Alternatively, the first apparatus may be configured to include an identity of the second device in the message sent to the first device, to cause the first device to transmit the processed sensor data, or information enabling access to the processed sensor data, to the second device after completing applying the at least one processing operation on the sensor data. Alternatively, the first apparatus may be configured to receive a notification from the first device comprising the processed sensor data, or information enabling access to the processed sensor data. Responsive to the notification, the first apparatus may be configured to provide to the second device the processed sensor data, or the information enabling access to the processed sensor data.

In some embodiments, at least one of the first device and the second device are comprised in a mobile user device peer to peer network, or a mobile cloud network.

In general there is provided a second apparatus, comprising a processor and software, the processor and software being configured to cause the second apparatus to at least transmit to a sensor node a request for processed sensor data, the request comprising an identity of a second node capable of processing sensor data, and to receive a message enabling access to the processed sensor data, wherein the second node is comprised in the same peer network as the apparatus.

In some embodiments, the second apparatus is configured to receive from the second node, or a further node comprised in the peer network, an indication that the second node has data processing capability that it is willing to provide. The second apparatus may be configured to maintain information on a plurality of members of the peer network, the information comprising information on capabilities each member is willing to provide. Data processing capabilities may comprise data manipulation capabilities such as, for example, text translation, image compression, video resolution re-scaling, audio processing or preparation of multimedia from separate media content, for example. In some embodiments, data processing capabilities comprise at least one of a data forwarding capability, such as forwarding or broadcasting to a further node or network, and a data storage capability, such as capability to input data into a memory. In general data manipulation involves transforming the content of data, while data forwarding and data storage involve communication and storage, respectively, without transforming the content of the data. That a member is willing to provide a capability may comprise that the member has an excess capability it does not currently need itself, that it is willing to provide to members of the peer network.

In some embodiments, peer network members are configured to share the information on capabilities each member is willing to provide with at least one sensor node, such as for example a sensor node comprised in a sensor network.

Figure 3:
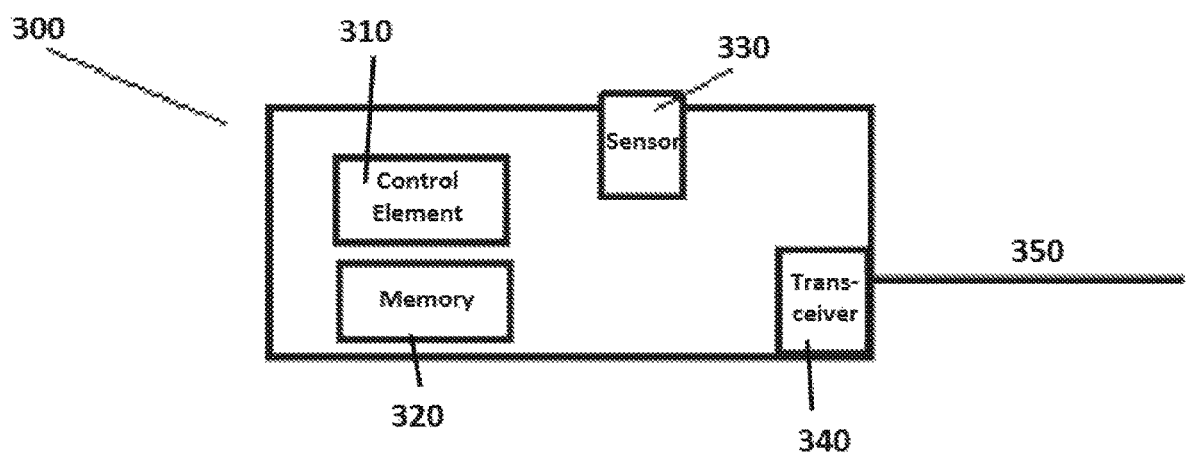
FIG. 3 illustrates an apparatus such as, for example, a sensor node in accordance with at least some embodiments of the invention.

FIG. 3 illustrates an apparatus 300 such as, for example, a sensor node in accordance with at least some embodiments of the invention. Apparatus 300 may comprise a sensor element 330 configured to produce sensor data by sensing the surroundings of apparatus 300. Sensing may comprise physical measurement. Apparatus 300 may comprise a control element 310, which may comprise a processor, set of processors, chipset or other integrated circuit enabled to control functioning of apparatus 300. Apparatus 300 may comprise memory 320, which may be configured to store sensor data obtained from sensor element 330 under the direction of control element 310, for example. Apparatus 300 may comprise transceiver 340 configured to enable the apparatus to communicate via communication path 350, which may be wire-line or wireless. By communicating, apparatus 300 may provide sensor data obtained with sensor element 330 to further nodes, and apparatus 300 may receive information, such as for example requests for sensor data.

Figure 4:
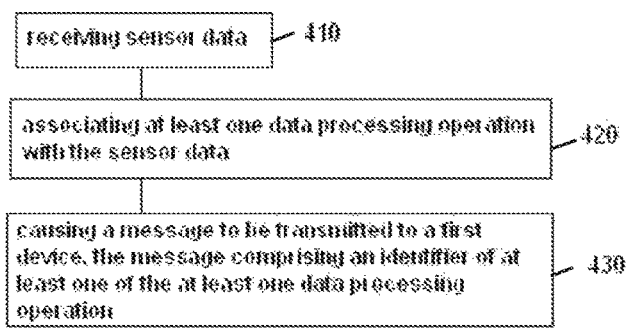
FIG. 4 is a first flowchart illustrating operations in accordance with an example embodiment of the invention.

FIG. 4 is a first flowchart illustrating operations in accordance with an example embodiment of the invention. The phases of the method illustrated in FIG. 4 may take place in a sensor node comprised in a sensor network, for example. In phase 410, sensor data is received, for example received in a control element or memory of a sensor node from a sensor element comprised in the sensor node. In phase 420, at least one data processing operation is associated with the sensor data. The associating may be performed by a control element of the sensor node, for example. In phase 430, a message is caused to be transmitted to a first device, the message comprising an identifier of at least one of the at least one data processing operation. The causing may be performed by a control element of the sensor node, wherein the control element may cause a transceiver comprised in the sensor node to transmit the message.

Figure 5:
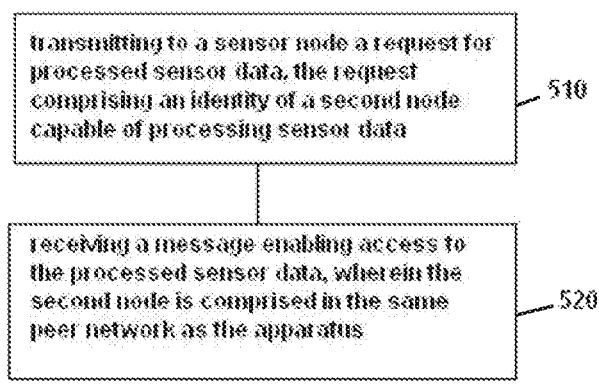
FIG. 5 is a second flowchart illustrating operations in accordance with an example embodiment of the invention.

FIG. 5 is a second flowchart illustrating operations in accordance with an example embodiment of the invention. The phases of the method illustrated in FIG. 5 may take place in a mobile comprised in a mobile cloud, for example. In phase 510, a request for processed sensor data is transmitted to a sensor node, the request comprising an identity of a second node capable of processing sensor data. In phase 520, a message enabling access to the processed sensor data is received, wherein the second node is comprised in the same peer network as the apparatus.

Figure 2:
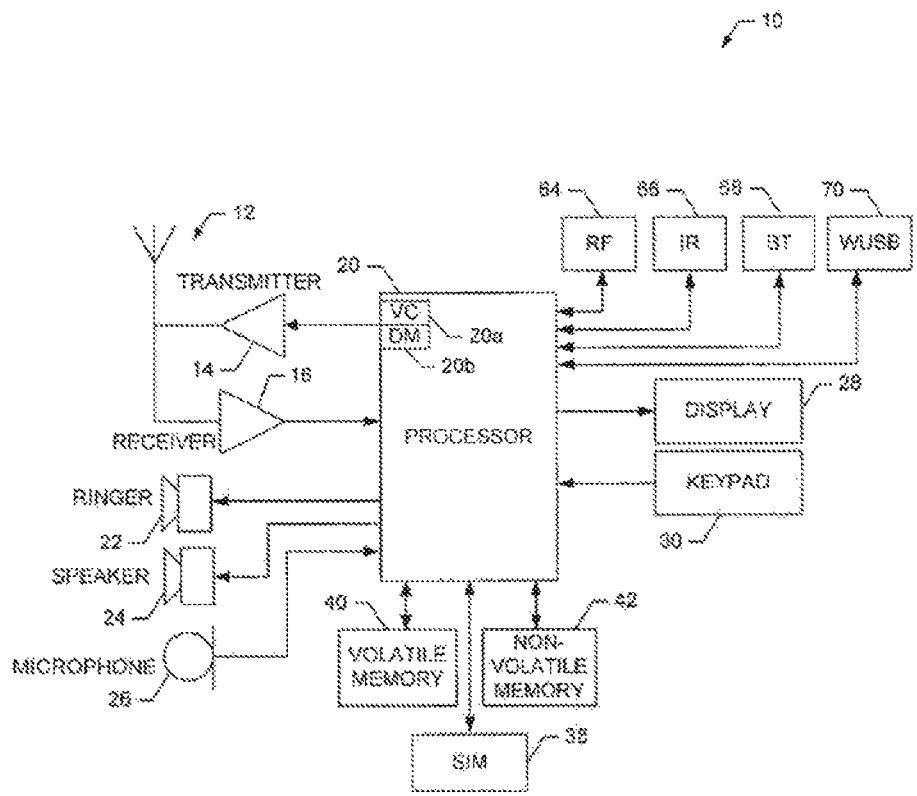
FIG. 2 illustrates a block diagram of an apparatus such as, for example, a mobile terminal comprised in a mobile cloud, in accordance with an example embodiment of the invention.

FIG. 2 illustrates a block diagram of an apparatus 10 such as, for example, a mobile terminal comprised in a mobile cloud, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20*a*, an internal data modem, DM, 20*b*, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™ BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40 non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is that richer multimedia experiences can be provided to mobiles. Another technical effect of one or more of the example embodiments disclosed herein is that less resources are needed to construct sensor networks. Another technical effect of one or more of the example embodiments disclosed herein is that since sensor nodes can be made simpler, they will consume less energy.

Embodiments of the present invention may be implemented in software, hardware, application logic or a combination of software, hardware and application logic. The software, application logic and/or hardware may reside on memory 40, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processor; and
   at least one memory including computer program code
   the at least one memory and the computer program code configured to, with the at least one processor, cause the apparatus to perform at least the following:
      originate and transmit, using a first radio access technology, to a sensor node a request for processed sensor data, wherein sensor data represents at least one physical property of surroundings of the sensor node, the request comprising an identity of a second node, distinct from the apparatus and from the sensor node, capable of processing sensor data; and
      receive a message enabling the apparatus access to the processed sensor data, wherein the second node and apparatus are both comprised in a mobile cloud which does not comprise the sensor node,
   wherein the apparatus is further caused to receive from the mobile cloud an indication that the second node has data processing capability it is willing to provide, wherein the apparatus is configured to communicate with mobiles in the mobile cloud using a second radio access technology, and
   wherein the apparatus is further configured to define a sequence of processing actions, such that when the processing actions comprised in the sequence are performed in order in the mobile cloud, a correct kind of processed sensor data is produced as an output from the last processing action in the sequence.

2. An apparatus according to claim 1, wherein the apparatus is further caused to maintain information on a plurality of members of a peer network, the information comprising information on capabilities each member is willing to provide.

3. An apparatus according to claim 2, wherein the information maintained on a plurality of members of the peer network enables virtualization of available capabilities in the peer network.

4. An apparatus according to claim 2, wherein the apparatus is caused to provide at least part of the information to the sensor node.

5. The apparatus according to claim 1, wherein the message enables the apparatus to access the processed sensor data by including, in the message, the processed sensor data.

6. The apparatus according to claim 1, wherein the message enables the apparatus to access the processed sensor data by including, in the message, information enabling the apparatus to fetch the processed sensor data from a server node.

7. The apparatus according to claim 1, wherein the apparatus is further configured to trigger execution of the sequence by prompting the sensor node to enable a third node to access sensor data, the third node being comprised in the mobile cloud.

8. A method, comprising:
   originating and transmitting, from an apparatus, using a first radio access technology, to a sensor node a request for processed sensor data, wherein sensor data represents at least one physical property of surroundings of the sensor node, the request comprising an identity of a second node, distinct from the apparatus and from the sensor node, capable of processing sensor data,
   receiving a message enabling the apparatus access to the processed sensor data, wherein the second node and apparatus are comprised in a mobile cloud which does not comprise the sensor node, and
   wherein the apparatus is further caused to receive from the mobile cloud an indication that the second node has data processing capability it is willing to provide, wherein the apparatus is configured to communicate with mobiles in the mobile cloud using a second radio access technology, and
   defining a sequence of processing actions, such that performance of the processing actions comprised in the sequence in order in the mobile cloud, produces a correct kind of processed sensor data is as an output from the last processing action in the sequence.

9. The method according to claim 8, further comprising maintaining information on a plurality of members of a peer network, the information comprising information on capabilities each member is willing to provide.

10. The method according to claim 8, wherein the apparatus is caused to provide at least part of the information to the sensor node.

11. The method according to claim 8, wherein the message enables the apparatus to access the processed sensor data by including, in the message, the processed sensor data.

12. The method according to claim 8, wherein the message enables the apparatus to access the processed sensor data by including, in the message, information enabling the apparatus to fetch the processed sensor data from a server node.

13. The method according to claim 8, further comprising triggering execution of the sequence by prompting the sensor node to enable a third node to access sensor data, the third node being comprised in the mobile cloud.

14. A non-transitory computer readable medium having stored thereon a set of computer readable instructions that, when executed by at least one processor, cause an apparatus to at least:

originate and transmit, from an apparatus, using a first radio access technology, to a sensor node a request for processed sensor data, wherein sensor data represents at least one physical property of surroundings of the sensor node, the request comprising an identity of a second node, distinct from the apparatus and from the sensor node, capable of processing sensor data, receive a message enabling the apparatus access to the processed sensor data, wherein the second node and apparatus are comprised in a mobile cloud which does not comprise the sensor node, receive from the mobile cloud an indication that the second node has data processing capability it is willing to provide, wherein the apparatus is configured to communicate with mobiles in the mobile cloud using a second radio access technology, and define a sequence of processing actions, such that when the processing actions comprised in the sequence are performed in order in the mobile cloud, a correct kind of processed sensor data is produced as an output from the last processing action in the sequence.

* * * * *